United States Patent Office 2,693,632
Patented Nov. 9, 1954

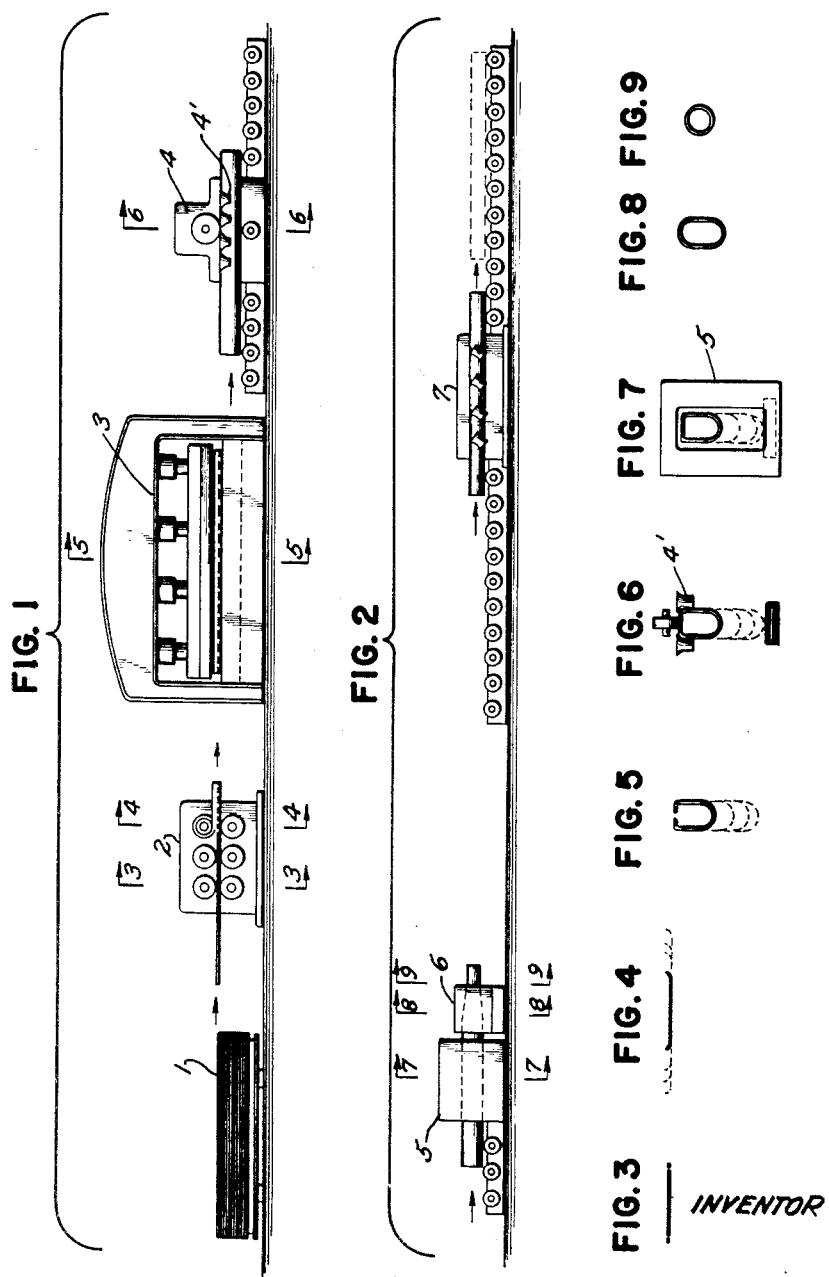

2,693,632

PROCESS FOR MANUFACTURING SEAM-WELDED STEEL TUBES

Louis Heussner, Herne, Germany

Application July 21, 1952, Serial No. 300,031

Claims priority, application Germany July 21, 1951

1 Claim. (Cl. 29—156)

This invention refers to a process for producing seam-welded steel tubes. The object of the invention is to improve, especially to simplify and to cheapen, the hitherto usual and known methods of manufacturing such tubes.

According to the known processes at first slotted tube-like bodies of circular cross-section are produced by bending sheets or strips by means of so-called cylindrical bending machines, whereupon in a second phase the slot is welded and in a third phase the tube so produced, is sized, straightened and finally cut into sections of suitable lengths.

The diameters of the tubes produced in this way are restricted from economical points of view, especially because with every increase of the tube diameter the sets of rollers, which have to be exchanged for every different diameter become more expensive. Also the time to be spent for every exchange of the roller sets is objectionable from the same point of view.

A further disadvantage of this process consists therein that in every case, in a substantial section on the head and on the end of every tube, the quality of the welded seam is not satisfying, so that this section represents waste and must be cut away. Further difficulties arise in the case of greater diameters if they are produced from strips, in consideration of the high weight of the coils, the manipulating of which requires expensive additional apparatus such as cranes, reels for storing the strips and so on.

In the case of resistance welding it is besides necessary to adapt the profile of the rolling transformer used to the exterior diameter of the tube by turning off, so that the life of the transformator is rather short.

Bending of the sheet or strip to produce the slotted tube-like body to be welded takes place in the case of tubes of greater diameter by means of three or more roller-plate-bending-machines. This procedure is rather lengthy as it is necessary to produce bodies with a practically exact circular section to enable to introduce said bodies subsequently into the roller sets of the welding machine. Because it is not possible to bring by means of such three or more roller-plate-bending-machines the edges of the sheet into the exact position, corresponding to the circular section, it is generally necessary after such bending to insert a further step before welding, in which by means of a so-called edge-bending-machine the edges of the sheet are finally bent into the correct position.

After welding in every case the tubes have to be subjected to a further treatment for the purpose of rounding them. This takes place generally by means of the same three or more roller-plate-bending-machines which are used for the first bending step before welding so that during this phase said machine is not at disposal for its main purpose.

This whole process as it is performed hitherto therefore requires an excessive high consumption of work and time and also a high number of machines.

The invention provides a process by which practically all of the mentioned disadvantages of the known methods are eliminated. The new process is based on the principal idea that it is an unnecessary waste of work to produce first a slotted tube-like body with exact circular section which section is unfavourable for the welding process if this exact circular form is necessarily subjected again to deformation by the subsequent welding process, after which it must be restored by another rounding process.

The process according to the invention is characterized thereby that in the first step not as hitherto a slotted tube of exact circular section, but a hollow profile of a section is produced, which is the most advantageous for machine-welding, i. e. flattened in the area of the edges of the slot, whereafter welding takes place and only then the hollow profile closed thereby is rolled into the final form of the tube of circular or eventually another desired cross-section.

The hollow profile produced according to this principal idea in the first step has advantageously a cross-section of elongated oval form, the parts of which adjacent the edges of the slot being flattened. The width of this pre-profile in the zone in which welding takes place is the same for every possible diameter of the tube, i. e. equal for all the tube diameters. Only the height of said pre-profile is different corresponding to the different diameters of the tube to be finally produced, i. e. the circumference of said tubes.

A hollow profile of such a section can therefore be manufactured independently from the final tube diameter without any exchanging of tools being necessary, i. e. always making use of the same rollers or presses and requiring only a fraction of the time which is otherwise necessary for the rolling of sheets into bodies of exact circular section.

The following welding takes place in this case in the most favorable manner, because the edges of the slot to be welded are flattened and for every final tube diameter have the same form, so that the slot of the pre-profile may be welded making use of one and the same set of welding rollers. The forces arising during welding are transmitted in the most advantageous manner nearly in the direction of the upper part of the hollow body.

The described elongated cross-section of the pre-profile makes it also possible in a more favourable manner to weld the slot by seam welding from the interior of the tube also in the case of so little diameters of the final tube that in the case of circular tubes they were not sufficient to introduce an automatic welding machine into the interior of the tube body.

Subsequent final shaping of the closed profile to the desired circular or in the given case other than circular cross-section can take place by rolling in a very simple manner. If a subsequent annealing treatment shall take place, this rounding process is performed preferably immediately after the annealing process without intermediate cooling.

In the attached figures the performance of the new process respectively its different steps are represented.

Figures 1 and 2 show the single subsequent steps and

Figures 3 to 9, inclusive, are elevational detail views showing the profiles which are formed from the sheet in the single subsequent steps of Figures 1 and 2, as would be viewed respectively on the lines 3—3; 4—4; 5—5; and 6—6 of Figure 1, and on lines 7—7; 8—8; and 9—9 of Figure 2.

In Figure 1 a stock of sheets 1 is represented, the length of which sheets corresponds to the length of the tube to be produced. From this stock the sheets are subsequently transported through the trimming machine 2, in which by bending the edges of the sheet from the flat profile represented in Figure 3 the profile of Figure 4 is formed. The profiles of Figure 4 have always the same form independently of the cross-section and of the wall thickness of the final tube and differ from another in the case of different tube diameters as indicated in Figure 8 only in respect to their width.

These profiles are now introduced into the trimming edging press 3 and bent into the form of the elongated oval hollow profile, flattened in the area of the edges to be welded with another as represented in Figure 5.

This pre-formed slotted profile is now introduced into the welding machine 4.

Figure #6 shows the action of this welding machine 4 and the pressing of the edges of the slot to be welded can take place in the most favourable manner by means of the side rollers 4', the setting of which is not altered in the case of different diameters of the final tube, because the width of the pre-formed body is always the same, independent of such differences of the final product. Only the level of the lowermost of the rollers supporting the body must be altered in the case of different diameters of the tube corresponding to the resulting elongation of the long axis of the profile.

In the following annealing furnace 5 the welding seam is normalised under the usual temperature of approximately 920° C., whereafter without intermediate cooling the tube is pressed through a die 6 and thereby their final circular or otherwise desired diameter is obtained.

This die 6 is the only part of the whole plant which must be exchanged in the case of different diameters of the final tube. Instead of a die 6 of course other suitable means, such as roller sets may be used.

Subsequently the whole body of now substantially circular respectively otherwise desired cross-section passes the ring-calibrating machine 7 shown in Figure 2 and is then cut into the desired length.

The advantages of the new process from which the most essential have been explained before are clearly to be seen. Besides of the already mentioned advantages a further advantage consists therein that it is possible to make use of pressure rollers of relative little diameters to press the edges of the slot during welding so that it is possible to arrange said rollers in very close vicinity and thereby to fix exactly the edges to reduce the danger of deficient weldings. Generally deficient weldings can be absolutely avoided thereby.

The possibility of making use of the heat necessary for re-annealing for the final rounding respectively forming is a further substantial economical advantage of the new process.

The process according to the invention can not only be applied for manufacturing tubes of comparatively low diameters and in this case tubes of such little diameters which hitherto could not be produced by means of bending machines, but offers besides substantial advantages also for manufacturing tubes of very large diameters. The output of the plants is substantially increased, because in the case of a change of one diameter of the final tube to another, no further alterations respecting adjustments are necessary besides the exchange of the die 6 (Figure 2) and the adjustment of some rollers, the time hitherto necessary for exchanging the sets of rollers et cetera being absolutely saved.

I claim:

A method of making a multiplicity of tubes of different sizes, comprising forming tube blanks to provide a shape having depending spaced parallel sides connected at the bottom by a loop and closed at the top by horizontal flattened portions in the same plane and having abutting edges to be welded, the width of the blank and the flattened portions in all of the multiplicity of blanks being the same and the depth of the blanks being greater than the width and variable to conform to the different sizes of the tubes to be finally formed, conveying the so formed blanks lengthwise between fixed welding pressure rolls which engage the top sides and top of the metal blank closely adjacent to the edges to be welded to press the abutting edges together during welding, the spacing of said rolls being the same for all of the multiplicity of blanks, supporting the bottom of the blank on rollers and altering the level of the supporting rollers to correspond to the different depths of the blanks and to hold the blanks in welding position and then reshaping each of the blanks to its final cross section.

References Cited in the file of this patent

UNITED STATES PATENTS

| Number | Name | Date |
|---|---|---|
| 1,135,539 | Mack | Apr. 13, 1915 |
| 1,534,133 | Murray | Apr. 21, 1925 |
| 1,786,759 | Lawson | Dec. 30, 1930 |
| 1,850,176 | Lawson | Mar. 22, 1932 |
| 1,866,256 | Heineman | July 5, 1932 |
| 1,866,257 | Heineman | July 5, 1932 |
| 1,913,714 | Lutz | June 13, 1933 |
| 2,020,276 | Crawford | Nov. 5, 1935 |
| 2,127,618 | Riemenschneider | Aug. 23, 1938 |

FOREIGN PATENTS

| Number | Country | Date |
|---|---|---|
| 429,762 | France | Sept. 30, 1911 |
| 298,733 | Germany | June 26, 1917 |
| 335,503 | Germany | Apr. 2, 1921 |
| 618,801 | Germany | Sept. 17, 1935 |
| 191,649 | Switzerland | Sept. 16, 1937 |